Feb. 6, 1934.                A. PODEL                1,945,954
                          SEALING MACHINE
                        Filed Feb. 26, 1930        12 Sheets-Sheet 1
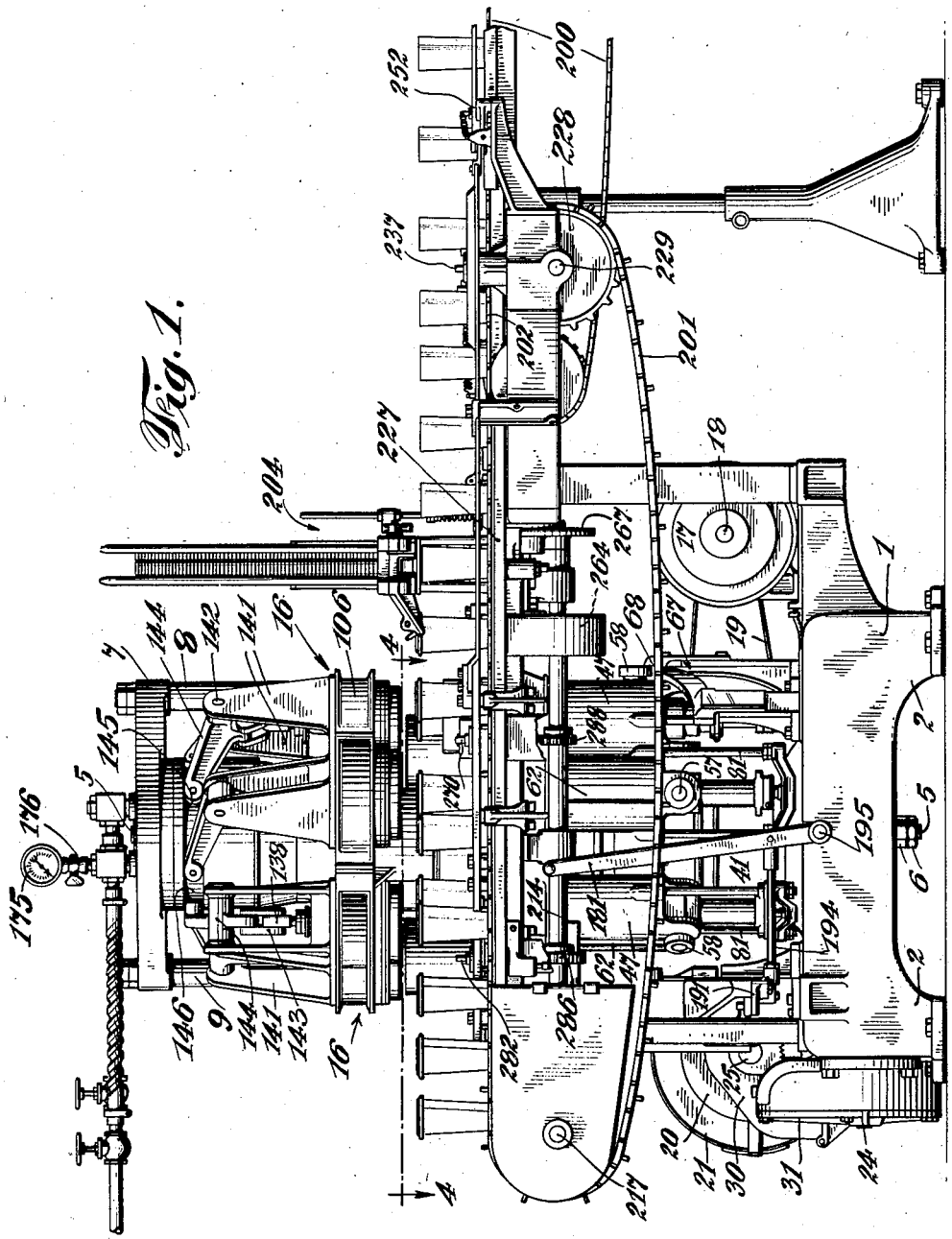
Inventor
Abraham Podel
By his Attorney,
Norman T. Holland

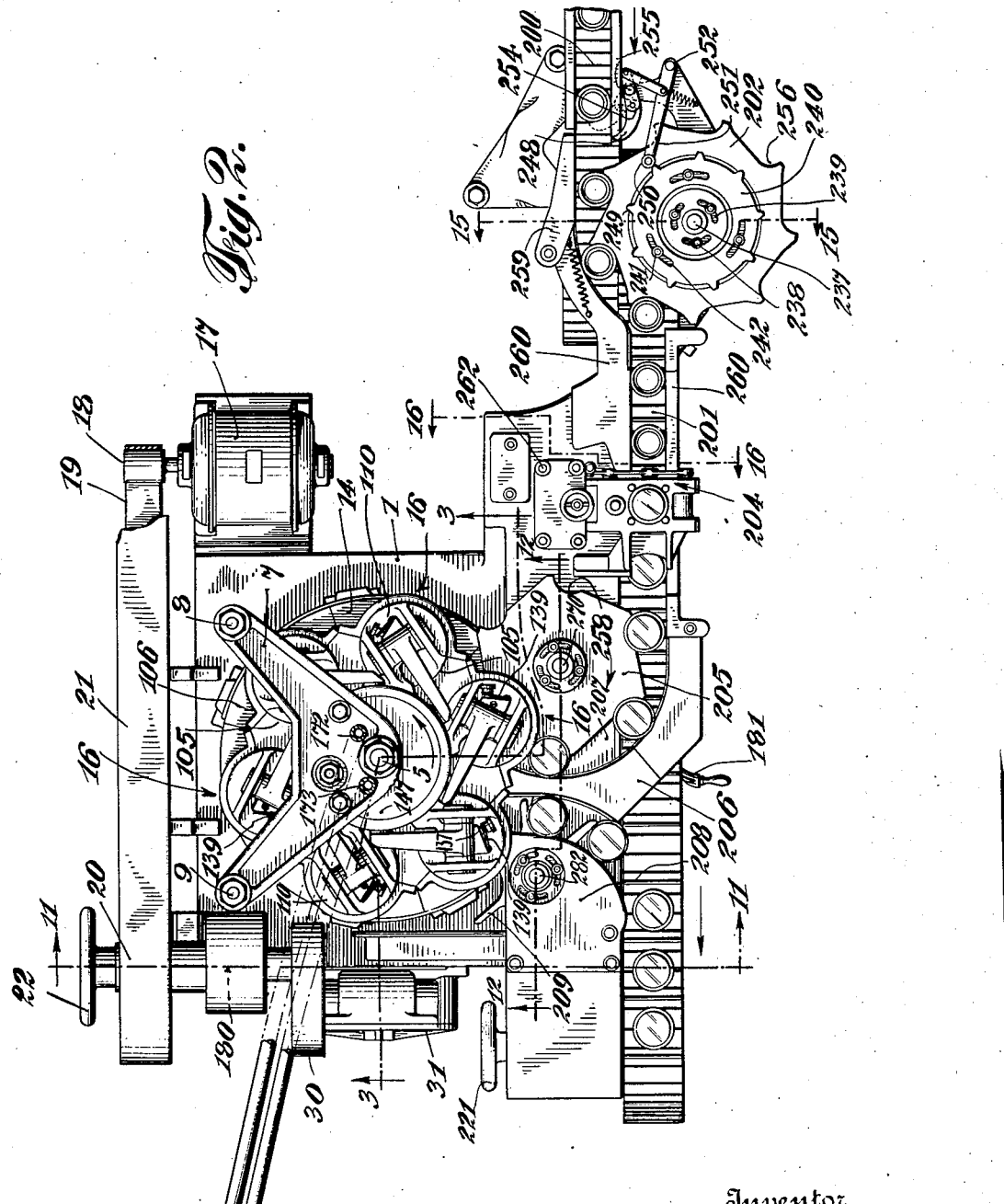

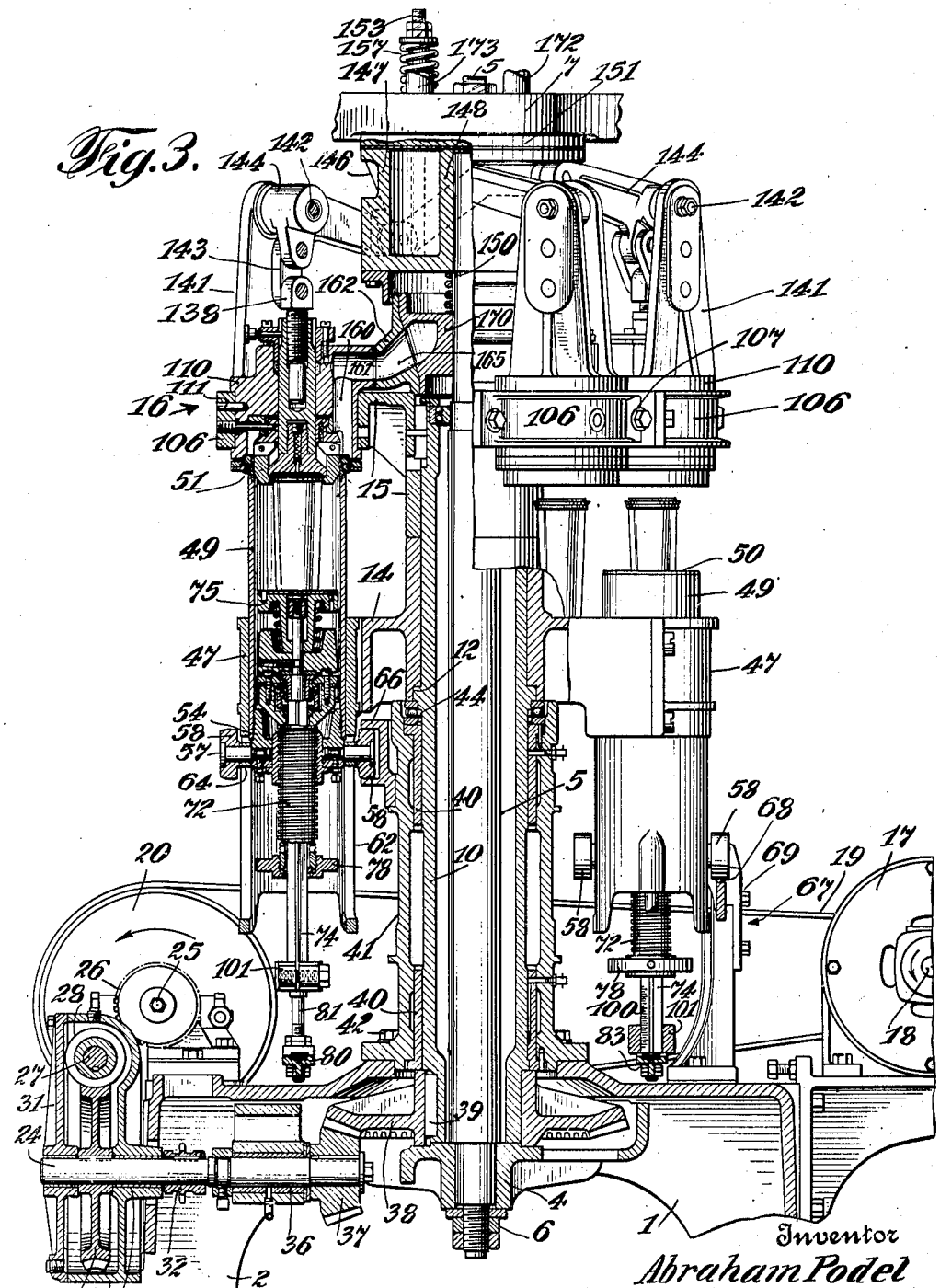

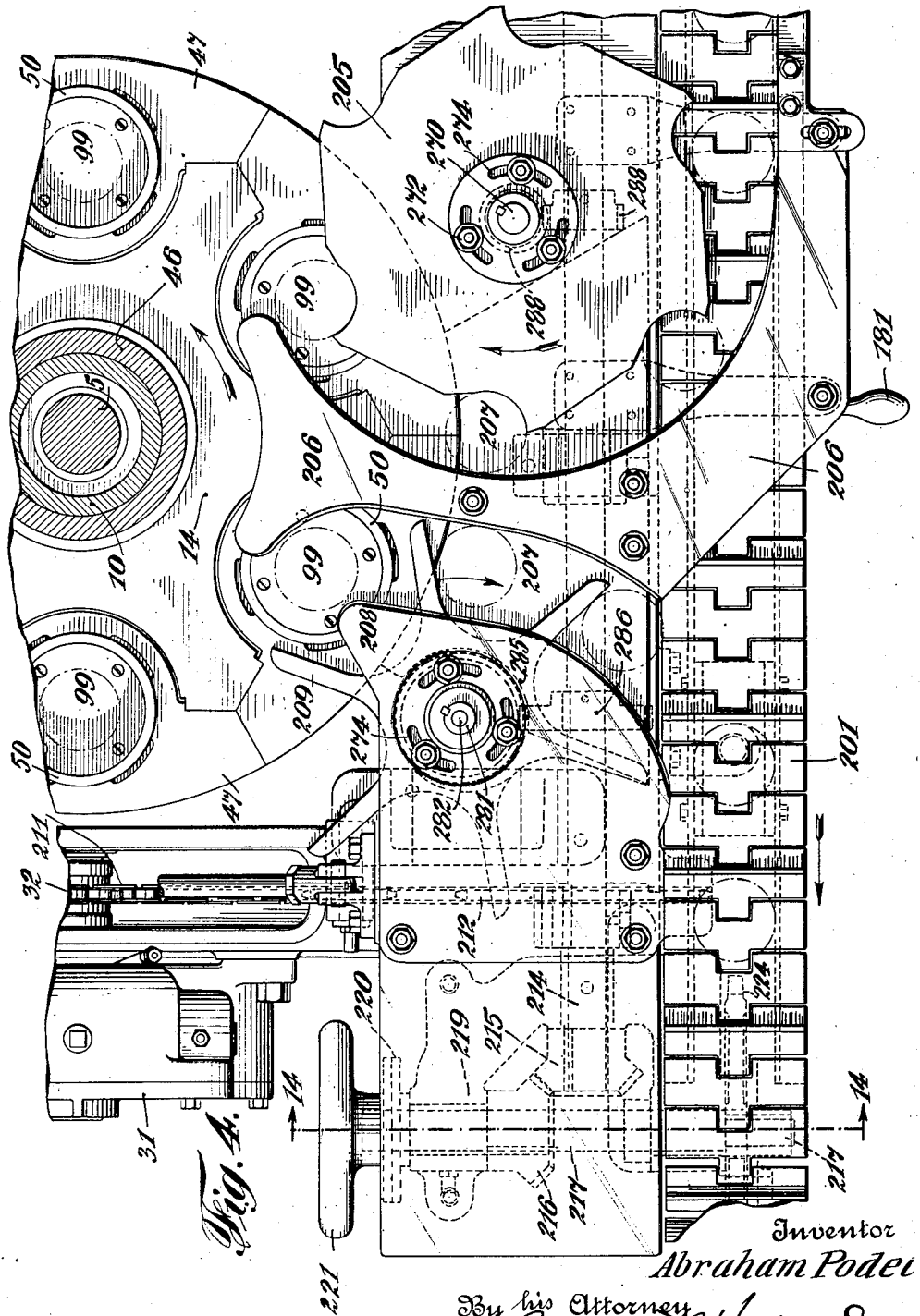

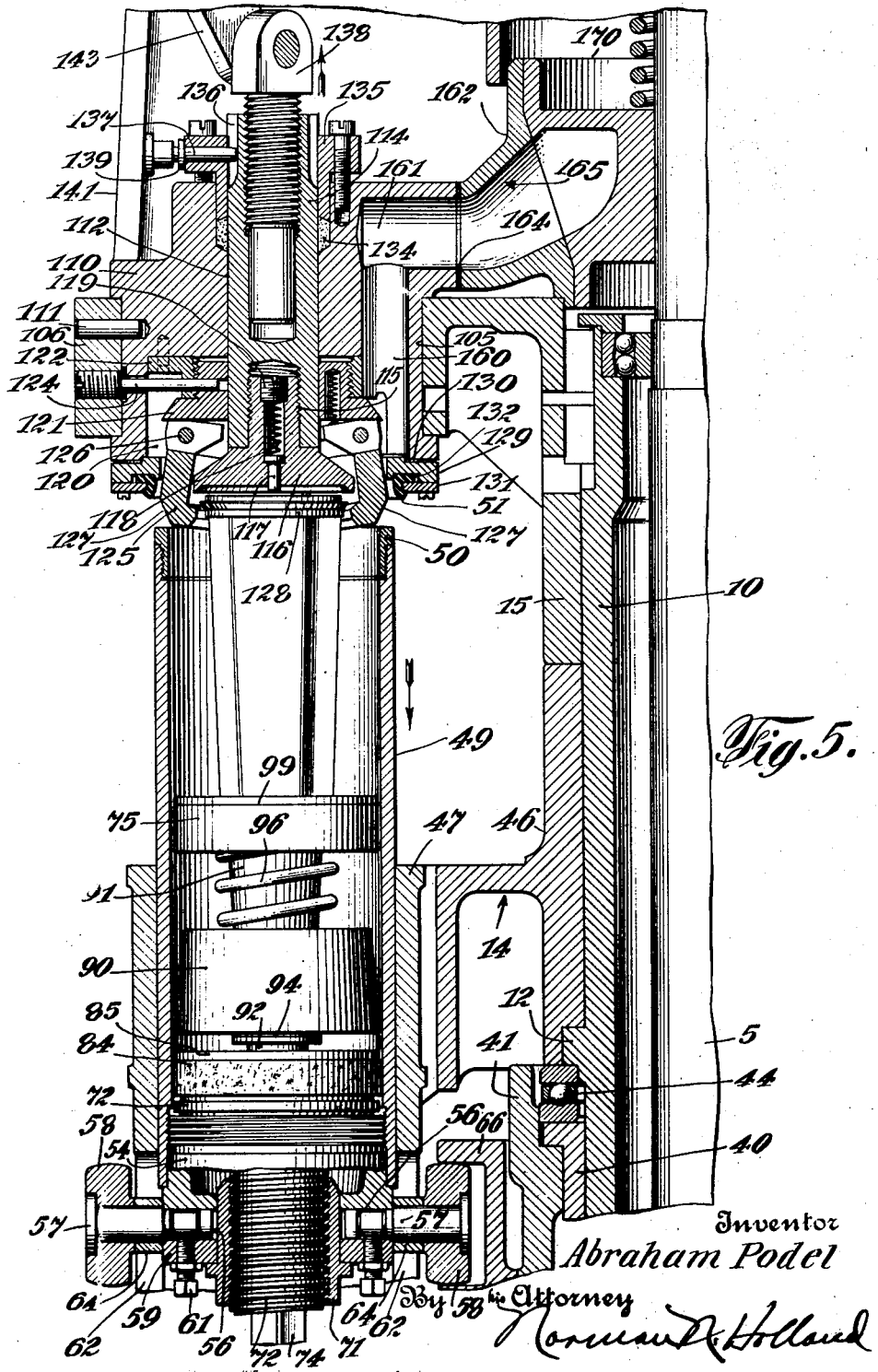

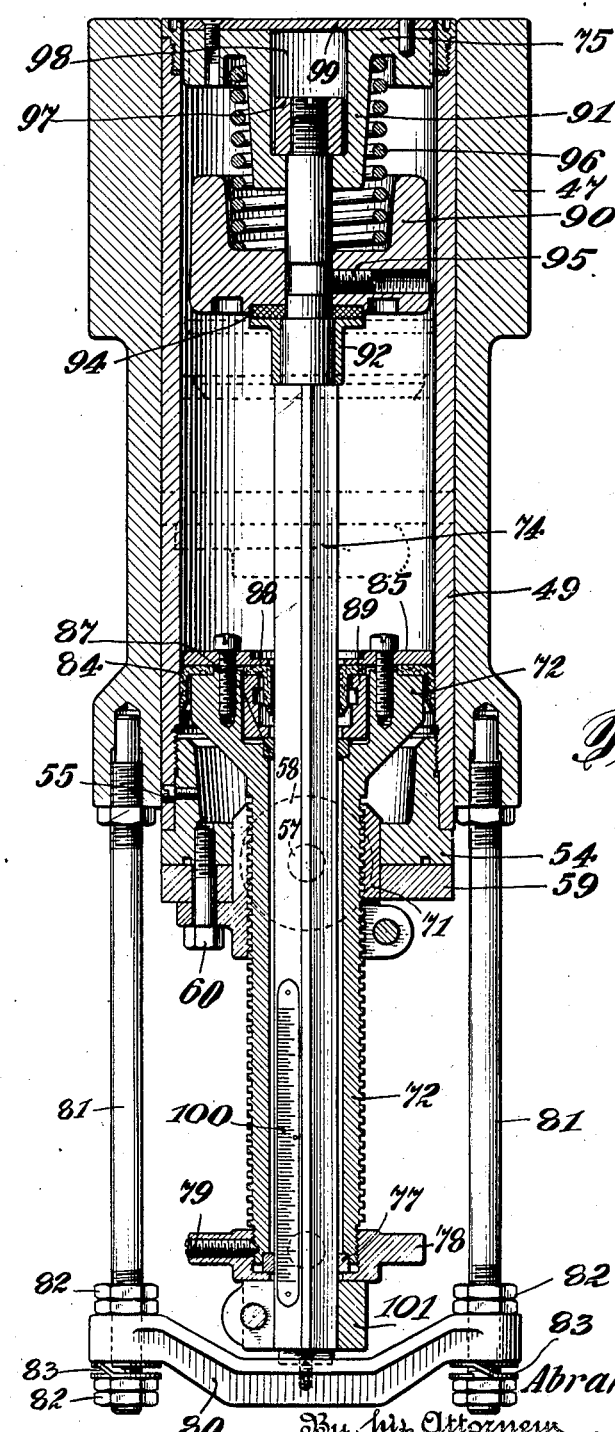

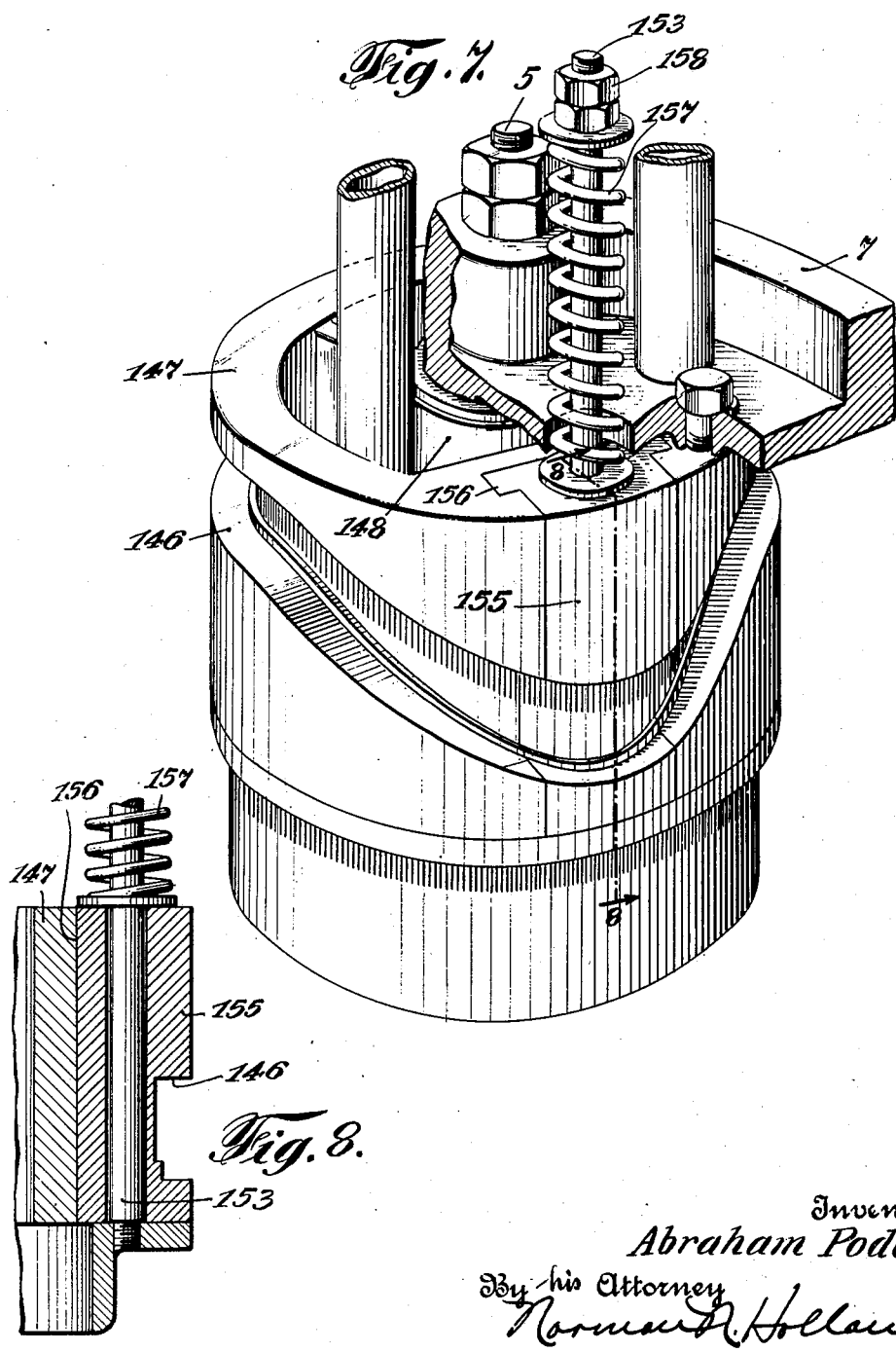

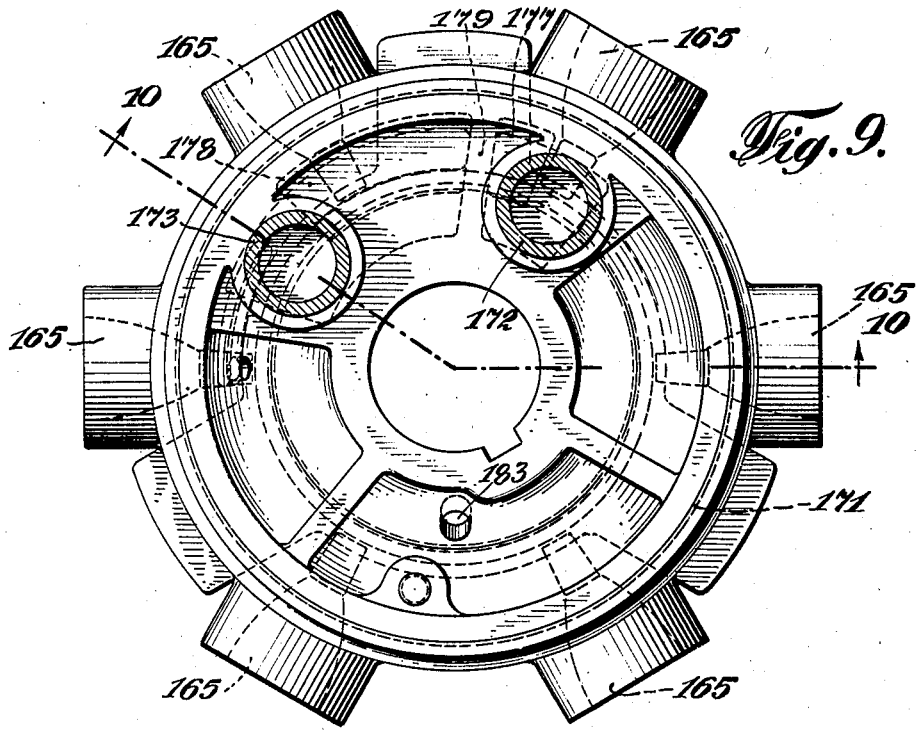
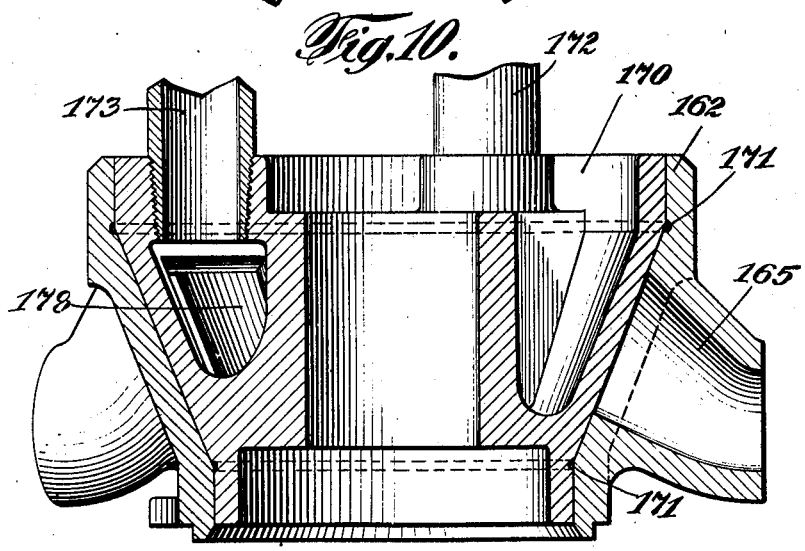

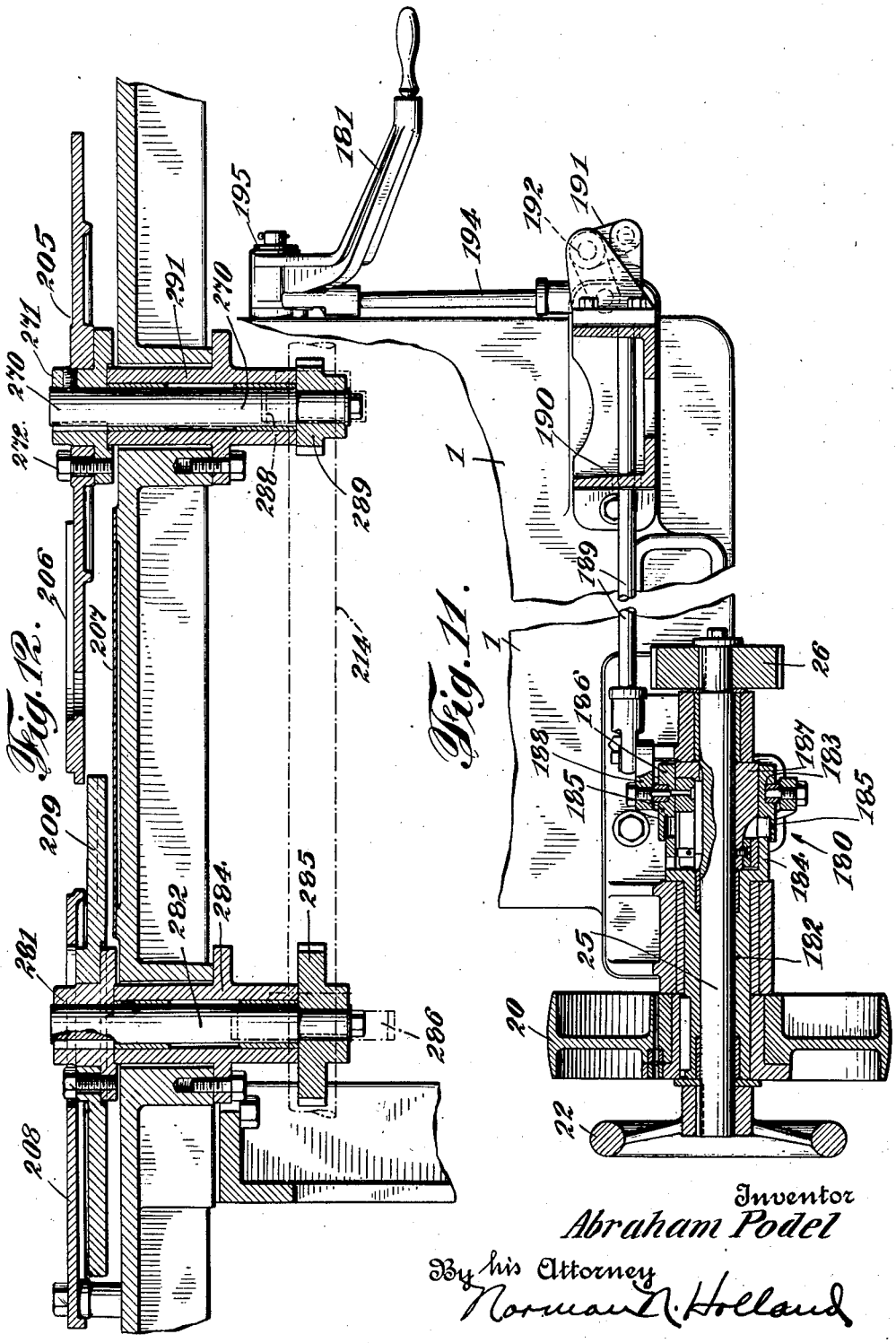

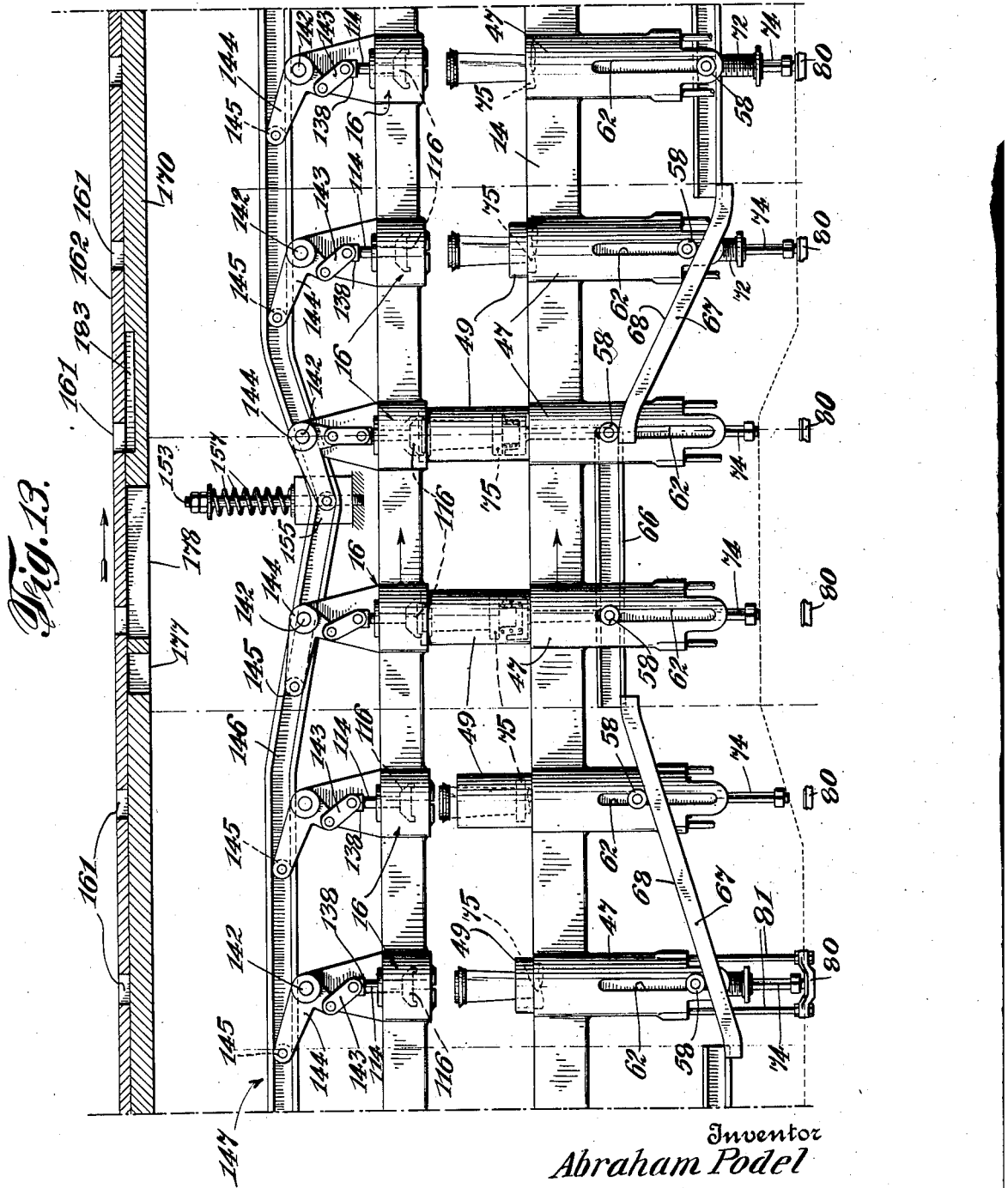

Feb. 6, 1934. A. PODEL 1,945,954
SEALING MACHINE
Filed Feb. 26, 1930 12 Sheets-Sheet 11

INVENTOR
Abraham Podel
BY Norman Holland
his ATTORNEY

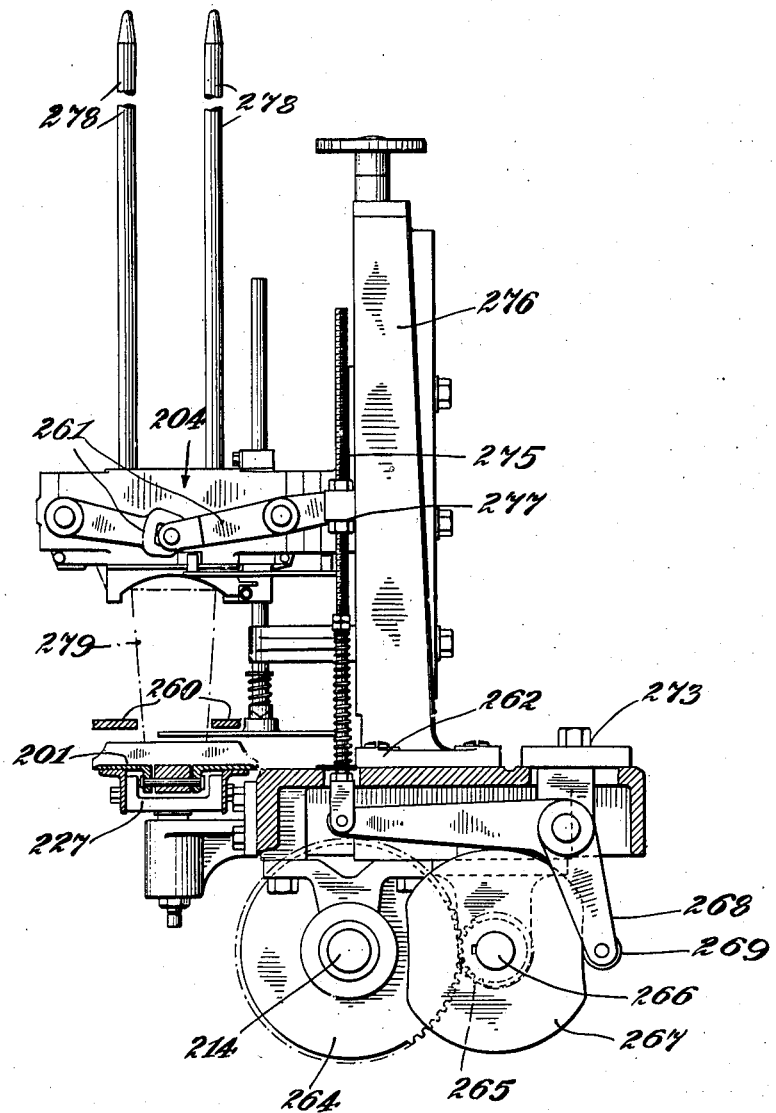

Patented Feb. 6, 1934

1,945,954

UNITED STATES PATENT OFFICE 1,945,954

SEALING MACHINE

Abraham Podel, Bronx, N. Y., assignor to Anchor Cap & Closure Corporation, Long Island City, N. Y., a corporation of New York Application February 26, 1930. Serial No. 431,621

37 Claims. (Cl. 226—82)

The present invention relates more particularly to a vacuum sealing machine although many of its features are applicable to sealing machines generally.

Home canning and preserving is being superseded more and more by packing plants where fruits, vegetables, jellies and the like are cooked and packed in small containers. The use of glass containers for this purpose is constantly increasing because they are sanitary and because they display the product to advantage. With many products it is necessary to exhaust the air from the container and hermetically seal the product in order to properly preserve it; such seals are desirable with many other products to safeguard against fermentation or decay. An additional advantage of vacuum seals is that the low pressure within the container permits ready sterilization after the sealing operation without creating excessive pressures within the containers and is conducive to a perfect seal and to perfect preservation. At the present time, a substantial portion of the products packed are sealed under a vacuum. A relatively low vacuum may be obtained by sealing products while hot. The decrease in pressure in the head space caused by the cooling of the contents after the sealing operation, gives a partial vacuum. Heating the entire contents of the packages in order to seal while hot slows up production and in many cases the products are sealed too cold and spoiled packages result.

A popular form of closure for sealing glass containers is one with a bead in the skirt of the cap and a gasket in the bead adapted to be telescoped over the side wall of the container and to be sealed thereto by deforming the bead and squeezing the gasket against the container. Such a package is illustrated in the United States patent to Edgar Scofield, No. 1,611,955, dated December 28, 1926. The present invention is particularly applicable to form a high vacuum within glass containers and to hermetically seal closures thereto, although the invention is not limited to such closures or to such machines.

In machines designed heretofore to form a vacuum in containers prior to the application of closures, there have been a number of objectionable features. An excessive amount of labor has been required to operate such machines. In some cases, the operators are required to present and remove individual containers with caps thereon at a speed of about fifteen packages a minute. At this rate the operator is required continuously to use both hands for presenting and removing the containers and one foot for operating the machine. Mistakes on the part of the operator are likely to result in broken containers and in injuries from the broken glass. The machines slow up production by means of their slow speed of operation. The vacuum in many cases is not uniformly high because increase in the speed by the operator cuts down the vacuum, a substantial period of time being required for the air in the product to escape after it has been subjected to the vacuum.

The present invention aims to overcome or minimize the above difficulties by minimizing the amount of labor required in operating sealing machines, by eliminating the manual operations noted above, and by increasing substantially the speed of sealing. The containers may, if desired, enter the sealing machine directly upon leaving the filling machine to minimize the cooling prior to sealing, thereby giving a high vacuum. In addition, the present invention aims to increase materially the degree of vacuum in the containers by utilizing two sources of vacuum or two vacuum conduits for exhausting the air from the container and by permitting these conduits to remain effective upon the containers for a longer period of time than heretofore. This enables the air within the container and within the product to be more fully removed, without decreasing the speed of sealing. As a matter of fact the number of containers sealed a minute greatly exceeds that possible with sealing machines heretofore. The present machine aims to seal upwards of fifty or sixty containers a minute and to automatically place the caps on the containers, exhaust the air from the containers and seal the closures thereto at this speed.

An object of the present invention is to provide an inexpensive sealing machine adapted to seal containers more effectively and efficiently than machines heretofore.

Another object of the invention is to increase the speed of sealing caps to containers and to minimize the labor required therefor.

Another object of the invention is to provide a machine which will effectively and consistently form a higher vacuum in containers and subject the contents of the containers to such vacuum for a longer period of time without decreasing the speed of operation.

Another object of the invention is to increase the vacuum in sealed containers by utilizing a plurality of suction conduits subjected to different degrees of vacuum and made effective, consecutively upon said container during the sealing operation.

Another object of the invention is to provide an inexpensive machine which is automatic in all its operations thereby increasing its speed and reliability and minimizing the amount of labor required for its operation.

Further objects of the invention consist in the combination of elements and arrangements of parts adapted to achieve the objects enumerated above.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming part of the specification, wherein Fig. 1 is a side elevational view illustrating a preferred embodiment of the invention;

Fig. 2 is a top plan view of the machine shown in Fig. 1;

Fig. 3 is a sectional view along the line 3—3 of Fig. 2 illustrating the driving and sealing mechanisms;

Fig. 4 is a sectional view along the line 4—4 of Fig. 1 illustrating the conveyor mechanism for delivering the containers to the machines and for removing them therefrom;

Fig. 5 is a detailed sectional view illustrating the parts of the sealing mechanisms prior to the sealing operation;

Fig. 6 is a detailed sectional view illustrating the chamber forming mechanism;

Fig. 7 is a fragmentary view illustrating the cam mechanism for effecting the sealing operation;

Fig. 8 is a sectional view along the line 8—8 of Fig. 7;

Fig. 9 is a sectional view illustrating details of the conduits and their associated elements for forming a vacuum in the containers;

Fig. 10 is a sectional view along the line 10—10 of Fig. 9;

Fig. 11 is a sectional view along the line 11—11 of Fig. 2;

Fig. 12 is a sectional view along the line 12—12 of Fig. 2 illustrating details of the container conveying mechanism;

Fig. 13 is a diagrammatic view illustrating the cycle of operation of the sealing mechanism in relation to the vacuum forming means;

Fig. 16 is a sectional view along the line 16—16 of Fig. 2.

Figure 14:
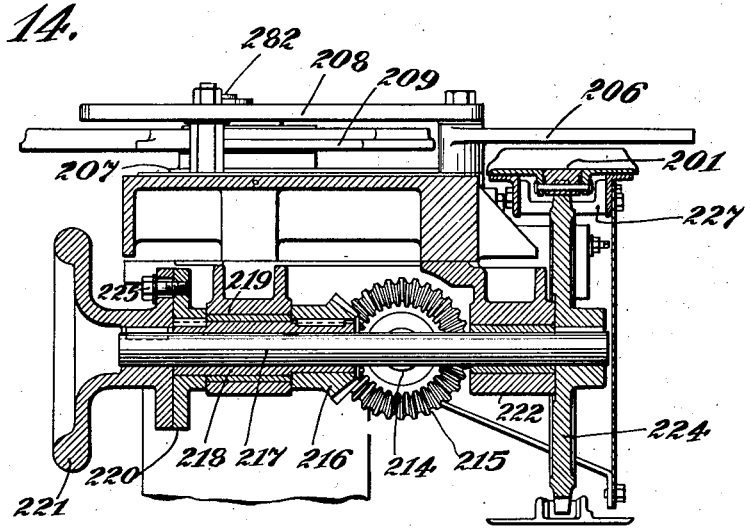
Fig. 14 is a sectional view along the line 14—14 of Fig. 4 illustrating the drive for the conveyor.
Figure 15:
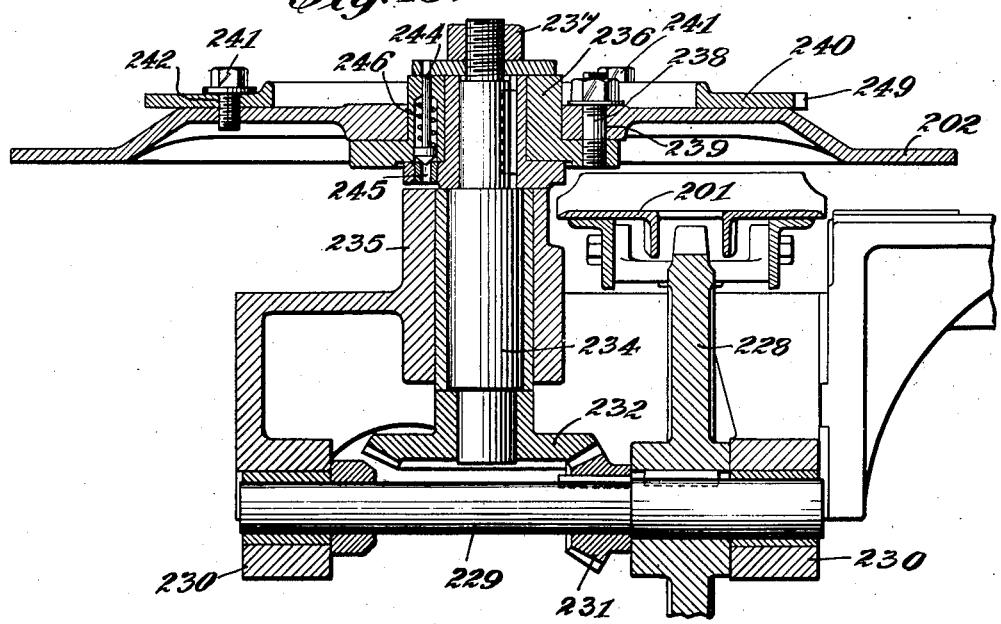
Fig. 15 is a sectional view along the line 15—15 of Fig. 2.

Described generally, the present machine comprises a base upon which the various parts are mounted and a vertical column extending upwardly from the central portion of the base. A table is mounted on the column and adapted to rotate about it. At the upper end of the column a series of sealing heads are supported above the table and above the vertically movable vessel supports on the table. The sealing heads and the movable vessel supports are adapted to rotate together about the column. Suitable cylinders are adapted to move upwardly from the table to form a chamber about the movable supports and about the sealing heads. A conduit connected periodically to the respective sealing heads exhausts the air from the chamber and from the container therein prior to the sealing operation. A suitable stationary cam at the upper end of the column effects the necessary sealing operation as the heads rotate about the column.

Vessels are preferably fed to the sealing machine in a continuous line by a suitable automatic mechanism and a suitable star wheel moves them onto the table rotating about the vertical column and positions them thereon with respect to the vertically movable supports so that when the supports are raised the containers will be properly positioned with respect to the sealing heads. As the heads and the table continue to rotate, a container is fed to each vertically moving support corresponding to a sealing head. Upon further rotation of the table, the cylinders are projected out of the table and form a chamber about the container. A vacuum is created in the chamber by opening a conduit connected to a source of vacuum and the containers are closed by the sealing heads. The sealed container is engaged by a suitable star wheel and removed from the rotating table onto a suitable discharge conveyor. In this manner, the vessels are automatically received, placed into the sealing machine, sealed in a vacuum and discharged without manual labor.

Referring again to the drawings and more particularly to Figs. 1, 2 and 3, there is shown a machine having a base 1 formed from a suitable casting and having legs 2 adapted to be bolted to the floor or other suitable foundation. At the center of the base or casting 1 there is provided a support 4 integral with the base, and a shaft 5 extending upwardly therefrom and secured in a suitable bearing in the support 4 by means of the nuts 6. The upper end of the shaft 5 is bolted to a casting 7 which is also secured to columns 8 and 9 which are, in turn, secured to the base 1. In this manner, the upper end of the shaft 5 is rigidly supported to sustain the column formed thereabout.

A hollow casting 10 is mounted on the support 4 and extends upwardly about the shaft 5. The upper end of the casting 10 is mounted on suitable ball bearings 11 so that it may be rotated about the shaft 5 with as little friction as possible. At the middle of the casting 10 there is provided an annular projection or shoulder 12 adapted to receive and support the table 14. Mounted directly above the table 14 is a second casting 15 which is also attached to and rotatable with the casting 10 and is adapted to support and rotate the sealing heads 16 and their associated parts. The sealing heads and supporting table will be described in detail hereinafter.

Any suitable means may be provided for rotating the casting 10 and its associated sealing mechanism but, as illustrated herein, (see Figs. 2 and 3), there is a motor 17, the shaft 18 of which is connected through a belt 19 to a pulley 20 which may be suitably enclosed by a covering 21 to guard against accidents and the like. For convenience, a hand wheel 22 is attached to the pulley 20 for the purpose of turning the machine over to test the adjustments of the various sealing mechanisms and to avoid the breakage of parts which might be occasioned by improper adjustments if the machine were started by the power drive. It will be understood, of course, that the pulley 20 may be driven directly from any source of power and the motor 17 may be eliminated if desired. The pulley 20 is operatively connected to the horizontal drive shaft 24 of the machine through a pulley shaft 25, and a gear 26 thereon co-operating with a similar gear on shaft 27 to rotate a worm gear 28 which meshes with a gear 29 on shaft 24. The gear 26 is enclosed by a suitable covering 30 and the gears 27, 28 and 29 are enclosed by a casing 31 to avoid accidents and to eliminate the entrance of foreign substances. The entire sealing machine conveyor mechanism and cap feed device is driven by the shaft 24. The cap feed device and conveyor mechanism are driven by a suitable chain on a sprocket 32 on the shaft 24, as described hereinafter. The shaft 24 is mounted in suitable bearings 35 and 36 in the framework of the machine and has on its end a bevel gear 37 meshing with a bevel gear 38 keyed at 39 to the hollow casting 10 extending upwardly about the vertical shaft 5. When the shaft 24 is rotated, the bevel gears 37 and 38 rotate the casting 10 which in turn rotates the table 14 and sealing heads 16 mounted thereon. Suitable bushings 40 at the lower end of the casting 10 and at the middle thereof, enclose the casting to facilitate its rotation within the cylindrical casting 41 which is bolted to the framework of the machine at 42. The shoulder 12 on the casting 10 and likewise the table 14, rigidly connected to the casting 10, are supported by the ball bearings 44. On the upper end of the table 14, the casting 15 is mounted and rigidly secured thereto, having suitable recesses for the sealing heads 16. In this manner, the rotation of the casting 10 rotates the table 14 and also the casting 15 which supports the sealing heads.

For convenience, the table 14 and the mechanism thereon will be described first and, afterwards, the casting 15 with the sealing heads thereon. The table 14 (Figs. 4 and 5) comprises a central casting 46 which fits about the column or casting 10 and has a series of recesses, here shown as six in number, adapted to receive the six castings 47. Each of these castings is provided with a cylindrical opening adapted to receive a hollow cylinder 49. This cylinder is adapted to reciprocate vertically in the apertures provided in the castings 47. The upper end of the cylinder 49 is preferably provided with an annular ring 50 threaded to the cylinder and adapted to engage a suitable gasket 51 on the sealing head. The primary purpose of the ring is to provide a very smooth surface for engagement with the gasket and to facilitate replacement of the upper end of the cylinder if it should become defaced or worn, so that a proper seal is made with the sealing head at all times. The lower end of the cylinder (see Figs. 3, 5 and 6) is provided with a suitable head 54 threaded into the lower end of the cylinder. A suitable screw 55 prevents rotation or loosening of the head while the machine is in operation. Suitable slots 56 are formed in the head 54 to receive the shafts 57 supporting the cam rollers 58. An annular ring 59 is secured to the bottom of the head to close said slots and is held in position by bolts 60. Suitable set screws 61, extend through the annular ring 59 and engage the reduced portions of the shafts 57 to hold them in proper position. The castings 47 which surround the cylinders 49, have suitable vertical slots 62 in which the shafts 57 of the cam rollers slide. These slots engage suitable bushings 64 on the shaft 57 and retain the cylinders in substantially the same position in so far as circumferential movement is concerned. The inner cam roller 58 on shaft 57 intermediate the cylinder and the column, engages a cam 66 (Figs. 3 and 5) which may be a casting secured to the stationary member 41. The outer cam roller 58 engages a stationary cam 67 which has an upper surface 68 adjustable by means of the bolts 69. The cam 66 co-operates with the inner cam roller 58 to retain the cylinder in its proper position to form a closed chamber about the lower end of the sealing head. After the sealing operation is complete, the cam surface 68 engages the outer cam roller 58 and lowers the cylinder to its bottom position. This avoids the drop that would otherwise attend such an operation due to the weight of the parts. The weight of the parts is sufficient to assure their return to their lower position on the cam 67. However, should further protection be desirable, the cam 67 may be provided with a positive device for returning the parts to their positions.

The head member 54, threaded to the lower end of the cylinder 49, is provided with a central aperture or bearing adapted to receive a bushing 71 which, in turn, is threaded on its interior to receive a threaded member 72. The member 72 is provided with a central aperture adapted to receive a square stem or rod 74 which is attached to the vertically movable table supports 75, which will be described hereinafter. The stem 74 is freely movable in the central aperture of the member 72 and is supported therein by a suitable gasket or packing 77 at its lower end which is held in position by a nut 78 threaded to the lower end of the member 72 and prevented from accidentally loosening by a set screw 79. The lower end of the stem 74 is adapted to rest upon the cross-member 80 which is secured by suitable threaded rods 81 to the lower end of the casting 47. The position of the supporting members 80 determines the height of the vertically movable tables 75 when in their lower position. The tables 75, in their lower position, should be flush with the main table 14. For this purpose, suitable adjustment nuts 82 are provided for regulating the position of the vertically movable table 75. Springs 83 may be provided intermediate the lower adjustment nuts and the member 80 in order to cushion the impact of the downwardly moving tables. The upper end of the member 72 extends outwardly substantially to conform to the inner surface of the cylinder 49. A suitable annular gasket 84, L-shaped in cross-section, with one leg of the L extending over the outer periphery of the member 72 and the other leg of the L extending downwardly to engage the inner surface of the cylinder 49 is held in position by a suitable disc 85 bolted to the upper end of the member 72. The disc 85 also holds in position gasket 87 and another L-shaped gasket 88 extending about the rod or stem 74 of the table support 75. These gaskets, 87 and 88, are mounted on opposite ends of a cup-shaped member 89, which offers sufficient space for the operation of the L-shaped gasket 88, one surface of which extends about the stem 74. The purpose of the gasket 84 is to form a hermetic seal between the member 72 and the cylinder 49. The purpose of the gaskets 87 and 88 is primarily to form a hermetic seal between the member 72 and the rod or stem 74. Preferably, the stem 74 is substantially square so that any liquid flowing through the table around the vertically movable table 75 will drain through these gaskets around the stem 74 during the intervals intermediate the sealing operations. In addition, the gaskets 88 and 84 cushion, to a limited extent, the impact on the plate 85, which is sustained during the upward movement of the table, as described hereinafter.

The vertically movable table 75 is mounted on the upper end of the stem 74. While this may be done in any suitable manner, as shown herein the upper end of the square member 74 is reduced in size and rounded to fit into a suitable aperture in a cup-shaped member 90 and a second member 91, which forms a part of the upwardly movable table 75. The cup-shaped member 90 rests upon a bushing 92 through the intermediation of a gasket 94 and is secured in position on the member 74 by a set screw 95. The cupped portion of the member 90 is adapted to receive a spring 96 which is coiled about the lower portion of member 91. The latter is held in position by means of a nut 97 fitting in a recess 98 in the member 91. A suitable plate 99 fits over the upper end of the member 91 and forms a smooth surface flush with the upper end of the casting 47 when in its lower position, as determined by the cross-member 80. The spring 96 is adapted to be compressed as the container is pressed against the upper sealing die for the sealing operation. This spring takes up any slight deviation from the proper adjustment between the table and the sealing head for the particular height of container. The position of the respective parts of the vertically moving cylinder 49 and its enclosed mechanism may be seen particularly in Figs. 3, 5 and 6.

In the operation of the table elevating and chamber forming mechanism, the cams 66 and 67 raise and lower the cylinder 49 through cam rollers 58. As the cylinder is raised, the member 72 is, of course, raised with it since it is rigidly attached thereto. The stem 74 of the vertically movable table 75 is loosely mounted within the member 72 and, hence, does not move up with the cylinder 49 until the plate 85 on the upper end of the member 72 engages the lower part of the cup-shaped member 90; whereupon, the table 75 is raised. During further movement of the cylinder 49 and the member 72, the table continues to rise thereby bringing the container thereon into the sealing position. When the upper end of the container engages the upper sealing die of the sealing head, as described hereinafter, the spring 96 is compressed and holds the container resiliently thereagainst during the slight remaining upward movement of the cylinder 49. To adjust for different heights of containers, it is merely necessary to raise or lower the member 72 with respect to the cylinder 49. This may be done by loosening the necessary adjusting nuts and rotating the member 72 which may be done by the application of a wrench or other tool to the member 78. For convenience, a scale 100 is affixed to the stem 74 so that the table may be adjusted for any suitable height of container by means of the scale. The collar 101 should, of course, be raised into engagement with the member 78 in order to assure the positive return of the table to its lower position.

Referring more particularly to the sealing mechanism which co-operates with the chamber forming cylinder described above, (see Figs. 1, 2, 3 and 5), the casting 15 which fits about the upper end of the member 10 and supports the sealing heads, has a series of recesses 105, (Fig. 2) here shown as six in number, with castings 106 secured in position by bolts 107 having semi- circular apertures adapted to form, with the apertures 105, circular bearings or apertures for the reception of the sealing mechanism. Since the several sealing heads are alike, it will be more convenient to describe a single sealing mechanism, it being understood that the other sealing mechanisms operate in the same manner. While any suitable sealing mechanism may be utilized for different types of caps and containers, the preferred embodiment herein provides a mechanism for forming a hermetic side seal on containers. Each sealing head comprises a main supporting member 110 which is held in position by the castings 106 and by bolts 111. A cylindrical opening or bearing 112 extends centrally through the member 110 and is adapted to receive a cylindrical member 114 which is provided with a threaded recess 115 at its lower end to receive an upper sealing die or anvil 116. A suitable pin 117 extends through an aperture in the center of the die 116 and is held in its outer position by spring 118 resting against a nut 119. The purpose of the pin is to engage and prevent the cap from coming off the container by the difference in pressure created when the chamber is suddenly exhausted. The air within the container causes a pressure on the interior of the cap due to its tendency to escape. A cup-shaped recess 120 in the lower end of the member 110 is adapted to accommodate a member 121 which fits about the member 112. The member 121 for convenience is threaded into a member 122 bolted to the member 110 and is prevented from becoming dislodged by a pin 124. By removing the pin 124, the sealing mechanism or the lower die may be quickly removed. The lower end of the member 121 has a series of slots with die members or jaws 125 secured therein on pins 126. It will be understood that the member 121 on the lower sealing mechanism is rigidly fixed to the stationary member 110 and, therefore, does not move in a vertical direction. The member 114 moves in a vertical direction and effects the sealing operation by pressing the container downwardly against the spring 96 supporting the table 75 and closing the space between the outer periphery of the member 116 and the die members or jaws 125 which are closed by the upward movement of the cylinder 49. It will be noted that the inner periphery of the cylinder 49 engages the inclined surfaces 127 of the jaws 125 and forces them inwardly to their closed position. The downward movement of the member 116 causes the bottom of the cap to contact with the inner surface and the sealing surface of the die member 116 to compress the bead 128 in the closure cap and to force the gasket tightly against the container to form a hermetic seal.

In order to form a closed chamber about the die members and about the container, a ring member 129 is bolted to the lower end of the member 110 and is separated therefrom by a gasket 130. A second ring member 131 engages the outer periphery of the gasket 51, seated in a recess 132, to hold it rigidly in position to engage the outer periphery of the upper end of the cylinder 49. A hermetic seal is formed about the upper end of the member 114 by means of a gasket 134 which is held in position by a bushing 135 bolted to the framework. The upper end of the member 114 is formed with a series of vertical slots 136 adapted to receive the pins 137 which are held in position by small springs 139. The purpose of these slots is to prevent the rotation of the member 114 except to permit adjustment between it and the member 138 threaded therein. By removing the pins 137, the member 114 may be rotated either up or down with respect to the member 138 threaded therein, which changes the position of the anvil 116 and the lower die or dies 125 to seal the containers either tightly or loosely as desired. Since these adjustments have to be within a small fraction of an inch, ready access and convenient adjustment are desirable.

Any suitable means may be provided for operating the sealing mechanism of the respective heads as they pass a particular point or station. The present embodiment, (Figs. 1, 3, 5 and 13), illustrates a pair of members 141 extending upwardly from the sealing heads and provided with suitable bearings to receive a pin or shaft 142. A bell crank 144 is mounted on the pin 142 with one end attached through a suitable link 143 to the member 138 threaded to the vertically movable member 114. The other end of the bell crank 144 is provided with a suitable cam roller 145 adapted to fit into a groove 146 of a stationary cam 147. The shape of the groove 146 is adapted to give the desired movement to the member 114 of the sealing mechanism. The link 143 co-operates with the bell crank and with the member attached to the sealing die to create a toggle effect, whereby a very high pressure may be applied to the sealing dies for compressing the bead of the cap during the final movement of the dies in the sealing operation. A cam 147, as illustrated herein, has a circular casting having a bearing 148 adapted to fit about the shaft 5, extending upwardly through the central portion of the machine. The annular shoulder 150 occasioned by the reduced end of the shaft 5, upon which the cam is mounted, supports the cam accurately in position. The central portion of the cam is, of course, hollow to decrease its weight and also to facilitate the passage of the vacuum conduits. The upper end of the cam is closed by a suitable plate 151. The casting 7, which is secured to the upper end of the shaft 5 by a suitable nut, extends over and rests upon the cam, as shown more particularly in Figs. 2, 3 and 7.

Due to the high pressure which is required to seal the containers, accurate adjustment is necessary to effect the proper seal and to avoid breakage of the glass containers. In order to correct, as far as possible, improper adjustments, the present embodiment of the invention provides a movable section 155, shown more particularly in Figs. 7 and 13. This section fits into a substantially T-shaped slot 156 so that it cannot move other than to slide in a vertical direction. A bolt 153 extends through the movable section having a coiled spring 157 on its upper end suitably held in position by lock nuts 158, whereby the compression in the spring may be adjusted as desired. When the cam roller passes this section, there is a slight resilience or cushioning effect in the application of the sealing forces and, should the adjustment be such as to provide too tight a seal, the spring will recede and minimize the effect of the misadjustment. In addition, this resilient section at the sealing station cushions the force to such an extent that a higher sealing speed may be utilized without danger of breakage.

The mechanism described hereinbefore relates more particularly to the sealing mechanism and may be utilized for effecting seals at a rapid rate without providing a vacuum in the containers. In order to obtain a vacuum seal, there is provided, in the sealing head, a vertical conduit 160 (Figs. 3, 5, 9 and 10) leading, at its lower end, to the chamber about the sealing mechanism formed by the cylinder 49 and connecting, at its upper end, through a horizontal conduit 161 to a rotatable member 162 which is attached to the conduit 161 through a gasket 164. The joint between the sealing head and the member 162 is such that the member 162 rotates as a part of the sealing head with the conduit 161 always in registry with the conduit 165. For the purpose of exhausting the air about the container at the time of the sealing operation, the central portion of the member 162 is substantially conical in shape to receive a stationary co-operating conical member 170. The member 162, rotating about the member 170, provides sliding valves which connect with the successive conduits 165 to subject the various sealing chambers to a vacuum consecutively. Suitable gasket members 171 are inserted between the members 162 and 170 to effect a hermetic seal between these two relatively movable members. A pair of vacuum conduits 172 and 173 are operatively connected to the central member 170, as illustrated more particularly in Figs. 9 and 10. The conduit 172 is connected to a relatively low vacuum line and the conduit 173 is connected to a relatively high vacuum line. By having two vacuum conduits, it is possible to maintain a higher vacuum more efficiently than with a single source. A low vacuum may be much more readily maintained than a high vacuum. For this reason, the low vacuum may be utilized for removing the major part of the air in the sealing chamber, and the high vacuum utilized for the final exhausting operation. Such a construction is not only more effective, it is also more efficient. A suitable pressure gauge 175, in the high vacuum line, which may be controlled by the valve 176, indicates, when desired, the vacuum to which the containers are being subjected. It will be noted, in Fig. 9, that the member 170 is provided with a relatively small chamber 177 to which the low vacuum line is connected and a larger chamber 178 to which the high vacuum line is connected. The two chambers are separated by a partition 179.

A diagrammatic illustration of the operation of the sealing mechanism and the exhausting devices is shown in Fig. 13 of the drawings by developing the periphery of the cylindrical construction into a single plane. It will be noted that the table 14 is illustrated as moving from left to right in this figure. The first sealing head illustrates a container just after it has been placed on the table with the cylinder 49 moved upwardly slightly by the engagement of the outer cam roller 58 with the inclined portion of the stationary cam 67. The lower end of the rod 74, attached to the vertically movable table 75, rests upon the cross-member or support 80. As this cylinder moves along to the position of the second cylinder by the rotation of the table and sealing heads, the outer cam rollers 58 are approaching the top of the inclined portion of the cam 67 and the cam rollers 145, for operating the sealing heads, are still riding in the horizontal portion of the groove 146. In other words, the sealing dies have not changed their position but the cylinder 49 has continued to move upwardly to form a chamber about the container. The third sealing mechanism has passed the inclined portion of the cam 66 and has reached the horizontal portion of this cam where the cylinder 49 is in its extreme upper position and in hermetic engagement with the sealing head to form a closed chamber thereabout. At this point, the cam roller 145 is moving downwardly to lower the sealing anvil or die 116 for the operation of the sealing mechanism to form a hermetic seal. The die has not, however, reached its extreme lower position. The vacuum conduit, controlled by the members 162 and 170 corresponding to the sealing head, has passed over the conduit 172 which is connected with the low vacuum source, and, therefore, a portion of the air has been exhausted from the chamber about the container. This exhausting operation takes place immediately when the cylinders 49 reach their upper position. In the third position of the sealing mechanism, the conduit 161, corresponding to this sealing mechanism, is registering with the vacuum conduit 173 which leads to the high vacuum source, whereupon the sealing chamber is further vacuumized. This relation is maintained until the sealing operation is completed by the cam rollers 145 reaching the lowest level of the cam 146, which is the fourth position of the sealing mechanism. At this point, the vacuum conduit 161 corresponding to the sealing mechanism, registers with a conduit 183, leading to the atmosphere, which relieves the vacuum within the chamber and permits the cylinder 49 to descend to its lower position. At this point, the cam roller 58 reaches a declined portion of the cam 67 which lowers the cylinder to the level of the table 14, as illustrated by the fifth sealing mechanism, whereby the cylinder is supported by the rod 74 resting upon the supporting member 80. At the same time, the cam 146 raises the cam roller 145 and bell crank 144 to return the sealing mechanism to its ineffective position. At the sixth position of the sealing mechanism, the cylinder 49 has reached the level of the table and the sealing mechanism is in its normal position, and the containers may be put on or removed from the vertically movable tables 75.

In operating the machine, it is desirable to have convenient means for stopping and starting the machine which may be readily controlled by the operator. This can be done by providing an electric switch for starting and stopping the motor. In the present embodiment, in addition to the usual means for stopping and starting the motor, there is provided a clutch 180 (see Figs. 2 and 11), which is operated by means of a lever 181 located in the front of the machine. The operator watching the containers coming in and leaving on the conveyors may instantaneously move the lever 181 to start or stop the machine, as occasion requires. While the clutch mechanism may be of any desired form, as illustrated herein, it is located intermediate the pulley 20 and gear 26 on the shaft 25. Referring more particularly to Fig. 11, it will be noted that the pulley 20 is keyed to a sleeve 182 extending about the shaft 25 and that the sleeve 182 has outwardly extending projections 184 adapted to mesh with projections 185. The projections 185 are on a cylindrical member 186 which is slidable along the shaft and is secured to a collar 187 keyed to shaft 25. A slidable member 183 is operatively connected to the control lever 181 through a link 188 bolted to the collar 187, rod 189, mounted in bearings 190 and attached to the link 188, bell crank 191, pivoted at 192 and attached at its other end to rod 194, which is also attached to the lever 181 pivoted at 195. By pushing the lever 181 upwardly in Fig. 11 or to the right in Fig. 1, the rod 189 and sliding member 186 are pushed to the left to cause the clutch members 184 and 185 to mesh. By pushing the control lever 181 to the left, the members 185 and 184 are released in the same manner. In this way, the machine may be started and stopped without disturbing the operation of the motor or the pulley 20. It will also be noted that the hand wheel 22 is connected directly to shaft 25 and, therefore, its operation is not affected by the control lever 181 and the clutch described herein.

The description thus far pertains more particularly to the mechanism for exhausting air from and for sealing the containers. The mechanism about to be described relates more particularly to the delivery of filled containers, with caps loosely applied thereto, to the machine and for taking the sealed containers from the machine. The mechanism is illustrated more particularly in Figs. 1, 2, 4, 12, 15 and 16. It will be understood that the filled containers can be delivered to the machine and removed from it manually but such operation would increase substantially the amount of labor required in the sealing operation. In some cases, however, the delivery and discharge mechanism may be dispensed with and certain advantages obtained.

Described generally the containers leave the filling machine not shown herein and are delivered by the conveyor 200, (Figs. 1 and 2) to a conveyor 201 through the intermediation of a star wheel 202 and its co-operating mechanism which spaces the respective containers so that each container will reach the sealing machine in its proper spaced relation. A capping device 204 applies the caps to the respective containers as they pass thereunder. The containers with caps loosely applied thereon reach the star wheel 205 which cooperates with a guide 206 to remove the containers from the conveyor 201 across the table 207 onto the rotating table 14 of the sealing machine. The star wheel 205 is properly adjusted as described hereinafter accurately to position the containers on the rotating table with respect to the sealing mechanism. The sealed containers are delivered to the conveyor 201 by the sprocket wheel 209 and its associated guides.

While any suitable source of power may be utilized for driving the conveyors for the delivery and discharge of the containers, it is desirable that these be operated in timed relationship with the sealing mechanisms. It is therefore convenient to utilize the drive for the sealing machine as the drive also for the delivery mechanism. This also permits a single source of power to operate the entire machine. These results are achieved in the present embodiment by providing a sprocket 32 on the main drive shaft 24 (see Fig. 3) with a chain 211 (see Fig. 4) connecting it with sprocket 212 on shaft 214. The shaft 214 is mounted in suitable bearings on the framework of the machine and has suitable gears adapted to drive the respective star wheels and the conveyor. The shaft 214 is mounted in suitable bearings on the framework of the machine and has suitable gears adapted to drive the respective star wheels and the conveyor. The shaft 214 has a bevel gear 215 (see Fig. 4 and 14) operatively connected to a bevel gear 216 on shaft 217. The bevel gear 216 is not keyed directly to the shaft 217 but to a sleeve 218 which is rotatable on the shaft 217 and extends through the bearing 219 for supporting the shaft with its end keyed to a flange member 220. The flange member 220 is bolted to a hand wheel 221 which is keyed to the shaft 217. The other end of the shaft 217 extends through a bearing 222 and has a sprocket wheel 224 thereon adapted to mesh with and drive the conveyor 201. The purpose of connecting the bevel gear 216 to the flange 220 and hand wheel 221 rather than directly to the shaft 217 is to permit the bevel gear 216 to be adjusted rotatably of the shaft 217 by loosening the bolt 225 and re-setting it in its slotted aperture by means of the hand wheel 221. In this way, it is merely necessary to loosen the bolt 225, rotate the hand wheel 221 until the conveyor 201 and the mechanism driven thereby is in proper position and thereafter tighten the bolt 225 to keep it in this position during the operation of the machine.

The conveyor 201 is supported throughout the length of the upper strand thereof by means of a casting 227 and passes over a sprocket 228 at its other end. The sprocket 228 is operatively connected to the star wheel 202 and its associated mechanism as illustrated more particularly in Fig. 15 through shaft 229 in bearings 230, bevel gear 231 thereon and bevel gear 232 on shaft 234 in bearing 235. A hub 236 is keyed to the upper end of the shaft 234 and is held in position thereon by nut 237. The star wheel 202 is adjustably secured to the hub 236 by means of bolts 238 fitting in elongated slots 239. A second star wheel 240 is adjustably secured to the star wheel 202 by means of the bolts 241 in the elongated slots 242. In order to eliminate breakage of containers in the machine due to the containers being caught between the star wheels and the guide, the hub 236 is secured to the shaft 234 through the intermediation of a pin 244 having a pointed end fitting in a bushing 245 and retained in position by a coiled spring 246. Whenever the pressure on the star wheel 202 exceeds a predetermined amount, the pin 244 slides upwardly and permits the shaft 234 to rotate without rotating the star wheel. When the container or other obstruction is removed the pin will sink again into the aperture in the bushing 245 and will be in proper position to continue operating.

The conveyor 200 (Fig. 2) may be driven directly by the filling machine or other suitable mechanism and delivers filled containers to the star wheel 202. In order to prevent the crowding of containers at the star wheel, a member 248 is adapted to engage each container and hold it in opposition to the conveyor 200 until the projection 249 engages the cam roller 250 on the lever 251 pivoted at 252 to oscillate the holding member 254 by pivot 255 thereby permitting a container to pass. The position of the holding member 248 is such that the conveyor 200 delivers the released container into one of the recesses 256 in the star wheel 202. The star wheel 240 may be adjusted with respect to the star wheel 202 by means of the slots 242 and bolts 241 to obtain this result. In addition, the star wheel 202 may be adjusted by means of the bolts 238 in elongated slots 239 to permit the star wheel to properly position the containers on the conveyor 201 so that they will engage the recesses 258 in the star wheel 205. Suitable guides 259 and 260 are provided to cooperate with the star wheel 202 and to deliver the containers onto the conveyor 201 and to keep them substantially in the center of the conveyor.

In order to eliminate the hand feeding of the caps to the containers, there is provided intermediate the star wheel 202 and star wheel 205 a cap feed device 204. Any suitable device may be utilized for this purpose such as the one described and claimed in my Patent No. 1,866,369. The cap feed may be bolted to the table at 262 and operated by means of a gear 264, on the main drive shaft 214, meshing with a gear 265 on shaft 266 to drive a cam 267 which operates the bell crank 268 supporting a cam roller 269 which sets against the cam 267. The bell crank 268 is mounted on a pivot 273 secured to the table. The bell crank operates the cap feeding members 261 by reciprocating the rod 275 supported by the vertical member 276. The cap feed mechanism may be adjusted for any size container by varying the length of the rod 275 by means of the nuts 277 and by determining the height of the feeding members 261. The vertical rods 278 form means for supporting a stack of caps to be fed to the containers 279.

The details of the delivery star 205 and the discharge star 209 together with their associated mechanism, is shown more particularly in Figs. 2, 4, and 12. The delivery star 205 is mounted upon the main table 207 on a stub shaft 270 which has a hub 271 keyed thereto. The star wheel 205 is secured to the hub 271 by bolts 272 fitting in the elongated slots 274. The position of the star 205 may be rotatably adjusted with respect to the other elements of the machine by means of the bolts 272. These adjustments may be readily made so that the star wheel properly cooperates with the guide 206 to position the containers on the vertically movable tables 75. The star wheel 205 and the guide 206 are adjusted so that there is about $\frac{1}{16}$ of an inch clearance between the containers and the guiding elements at the point where the containers are released. When it is necessary to adjust the machine for a different size container, a suitable set of star wheels are substituted for the old ones by removing the bolts 272.

After the containers are properly positioned on the rotating table and the sealing operation is completed during the rotation of the table 14, the sealed containers are delivered on the other side of the guide 206 to a star wheel 209. The successive projections on the star wheels 209 engage the containers which are on the rotating table and move them between the guides 206 and 208 on to the conveyor 201 where they are delivered to any desired location. The star wheel 209 is not ordinarily removed for different size containers and therefore may be mounted beneath the guide 208 on a hub 281, (Fig. 12) keyed to a shaft 282 in bearing 284, bolted to the table. The lower end of the shaft 282 has a gear 285 adapted to mesh with a worm gear 286 on the main drive shaft 214 for rotation of the star wheel 209. The star wheel 205 is rotated in a similar manner by a worm gear 288 meshing with gear 289 on shaft 270.

In the operation of the machine after making adjustments for the size of the containers to be sealed, it is advisable to turn the machine over by the hand wheel 22 through at least one cycle to see that all parts move freely. The motor 17 or other source of power may then be started by moving the lever 181 slowly to the right, thereby engaging the clutch mechanism 180 and setting the machine in motion. The drive belt 19 rotates the pulley 20 attached to the shaft 25 having the gear 26 connected thereto. The gear 26 meshes with a similar gear 28 which drives the gear 29 attached to the main drive shaft 24 thereby transmitting rotation to the column 10 and its associated parts. A sprocket 32 on the shaft 24 is adapted to drive the chain 211 which connects it with the sprocket 212 mounted on shaft 214. The shaft 214 has suitable gears adapted to drive the delivery and discharge conveyor 201.

When the machine is operated the containers are delivered from a suitable filling machine along the conveyor 200 to the star wheel 202. The arm 254 is adapted to stop the respective containers delivered and released one at a time so that it will be received in a recess in the star wheel where the containers are properly spaced for the sealing machine and are transferred from the conveyor 200 to the conveyor 201 which is properly timed with respect to the sealing machine. As the containers pass along the conveyor 201 held in position by suitable guides the capping mechanism 204 places the cap loosely upon each container. The containers with caps thereon reach the star wheel 205 and the guide 206 which positions them properly on the rotating table of the sealing machine and within the cylinder 47 in accurate position for the sealing operation. The star wheels 202 and 205 are each adjustable to secure proper delivery and accurate position of the delivered containers. As the table 14 rotates, the cylinders 49 move upwardly as shown more particularly in Fig. 13 through the intermediation of the cam rollers 58 riding upon the inclined portion of the cam 67. As the cylinder 49 continues to move upwardly, the member 85 engages the member 92 (see Figs. 3, 6 and 13). The table 75 then moves upwardly with the cylinder 49 so that the container is raised toward the sealing head.

During this period the sealing mechanism has not changed its position since the cam roller 145 has been travelling along a horizontal portion of the cam 146. Immediately that the cylinder 49 has reached its upper limit, i. e., when the cam roller 58 has reached the horizontal portion of the cam 66 and the upper ring of the cylinder 49 has engaged the rubber gasket 51, the sealing mechanism begins to operate by reason of the fact that the cam roller 145 has entered a declined portion of the cam 146. It should be noted that the cylinder 49 just as it reaches its upper position, engages the inclined surface 127 (see Fig. 5) to force inwardly the lower sealing jaws so that they are in position to engage the lower side of the bead of the cap. As the table continues to rotate, the cam roller 145 is forced further toward the container and when it reaches its lower limit determined by the bottom of the dwell in the cam 146, the sealing operation is completed; that is, the dies 125 and 116 have been forced sufficiently close to each other to squeeze the gasket from the bead of the cap and force it into sealing relation with the container.

The security of the seal is controlled by the proximity of the two dies in their final position. This may be adjusted by (see Fig. 5) removing the pin 137 and rotating member 112 by means of a suitable wrench to raise or lower it with respect to the supporting threaded member. After the sealing operation is complete, the cam roller 145 moves along the inclined portion of the cam 146 to open the sealing dies and the cam roller 58 moves downwardly along the declined portion of the cam 67 to lower the cylinder 49 to the level of the table. The vertically movable table supporting the sealed container moves with its cylinder until a position is reached where the table 75 is flush with the table 14. At that time the stem 74 supporting the table 75 engages its support 80 and the table ceases to move downwardly but the cylinder 49 continues downwardly until it reaches the horizontal portion of the cam 67 where it is flush with the table 14. The sealed jar is then ready to be delivered from the machine.

In order to form a vacuum in the containers it is necessary that the chamber formed by each cylinder 49 about a container be exhausted prior to the sealing operation. The mechanism for achieving this result is shown in detail in Figs. 5, 9 and 10 and its operation is illustrated diagrammatically in Fig. 13. The respective conduits 161 for the sealing head are each brought into registry with vacuum ports 172 and 173 just prior to the sealing operation. The vacuum port 172 is connected to a low vacuum line and the vacuum port 173 is connected to a source of high vacuum in order to obtain a very high vacuum efficiently. The major portion of the air is exhausted by means of a low vacuum and the containers are thereafter placed under a high vacuum for a substantial period of time to complete the exhausting operation. Immediately after the seals are made, the vacuum conduit 161 leading to the sealing head, where the sealing operation has been effected, is brought into registry with an air port 183 which opens the chamber to atmospheric pressure and permits the cylinder 49 to be returned to its lower position. When the containers have completed the sealing cycle they are engaged by the delivery star wheel 209 and returned to the conveyor 201 from where they may be removed manually or delivered to another suitable conveyor.

It will be seen that the present invention provides an improved vacuum sealing machine which is adapted to seal containers varying in size. The machine can be operated more rapidly than other machines and is adapted to provide a high vacuum. By using a high and low source of vacuum a higher vacuum is obtained with less pumping. The vacuum chambers are so constructed that a hermetic seal is effected when they are in their raised position. The sealing chuck and die cooperate with the vacuumizing operation thereby sealing the containers under a high vacuum. This efficient hermetic seal is conducive to perfect preservation of foods. The auxiliary mechanisms, such as the cap feeder and conveyors are timed with respect to the sealing machine. The manual labor required is reduced to a minimum. The machine is rugged in construction, simple in operation and can withstand the rough usage to which it may be subjected. The operating costs of the present machine are reduced to a minimum by utilizing a single source of power.

As various changes may be made in the form, construction and arrangement of parts without departing from the spirit and scope of the invention and without sacrificing its advantages, it is to be understood that all matter herein is to be interpreted as illustrative and not in a limiting sense.

Having thus described my invention, I claim:

1. In a device of the class described, the combination of a rotatable table, cylindrical members mounted on said table, means rotatable with said table for closing the upper ends of said cylinders, and means for moving said cylindrical members upwardly to close the upper ends thereof and to form chambers substantially above said table.

2. In a device of the class described, the combination of a rotatable table, hollow members mounted upon said table adapted to move upwardly therefrom to form a series of chambers means rotatable with said table adapted to close the upper ends of said hollow members when in their upper position, and means rotatable with said table for moving said hollow members upwardly from the table consecutively.

3. In a device of the class described, the combination of a rotatable table, a series of hollow members mounted adjacent the periphery of said table, said hollow members being adapted to move in a vertical direction and the upper ends thereof being normally flush with said table, means for moving said hollow members upwardly as said table revolves and devices rotatable with said table for closing the end of said hollow members when in their upper positions.

4. In a device of the class described, the combination of a table, hollow members mounted adjacent the periphery of said table, means for moving said hollow members upwardly from the table to form a series of chambers, means rotatable with the table for closing the upper ends of said hollow members while in their upper positions and supporting means in said hollow members normally flush with the surface of said table and adapted to move upwardly with said hollow members a predetermined distance.

5. In a device of the class described, the combination of a hollow member, a supporting means therein, a sealing head mounted above said hollow member having movable jaws, and means for raising said hollow member into engagement with the lower side of said sealing head to form a chamber thereabout, said hollow member being adapted to operate said movable jaws of the sealing head.

6. In a device of the class described, the combination of a hollow member, a support within said hollow member having a downward extension, means closing the lower end of said hollow member and forming a hermetic seal about said downward extension, means for closing the upper end of said hollow member, and means for raising said hollow member into engagement with said means for closing the upper end thereof, said means closing the lower end of said hollow member being adapted to engage and raise said support when said hollow member has been moved upwardly a predetermined distance.

7. In a device of the class described, the combination of a sealing head having segmental jaws adapted to close about a closure cap, a hollow member adapted to engage the lower side of said sealing head and to form a chamber thereabout, said hollow member being adapted to engage and close said segmental jaws when in its upper position.

8. In a device of the class described, the combination of a sealing head having segmental members adapted to close about a closure cap and an upper member adapted to cooperate with the segmental members to seal the closure, a cylindrical member adapted to engage and close about the lower end of said segmental members to form a chamber thereabout, means for exhausting the air from said chamber, and means for moving said upper member toward said segmental members to seal the closure cap to a container.

9. In a device of the class described, the combination of a rotary table, a plurality of hollow members mounted adjacent the periphery of said rotary table and movable in a substantially vertical direction, a sealing head mounted above each of said hollow members, said sealing heads being rotatable with said table, means for bringing said sealing heads and said hollow members into engagement consecutively to form chambers about said sealing heads, and means consecutively for drawing a vacuum in said chambers consecutively.

10. In a device of the class described, the combination of a rotary table, a plurality of hollow members mounted adjacent the periphery of said table, sealing heads mounted above said hollow members, supporting means for a container in said hollow members, means for raising said hollow members consecutively into engagement with said sealing heads, means for raising said supporting means consecutively to bring said containers into operative relation with said sealing heads, means for drawing a vacuum in said chamber, and means for operating said sealing heads to seal closure caps to containers.

11. In a device of the class described, the combination of a plurality of hollow members circularly arranged, supports for containers in said hollow members, sealing heads mounted above said hollow members, means for rotating said hollow members about a common axis, means for raising said hollow members consecutively to bring them into engagement with their associated sealing heads, means for raising the supports in said hollow members, and means for sealing a closure cap on a container while a hollow member forms a chamber about the lower part of one of the sealing heads.

12. In a device of the class described, the combination of a plurality of hollow cylindrical members adapted to rotate about a common axis, a plurality of sealing heads mounted above said cylindrical members, means for rotating said sealing heads and said cylindrical members in operative relation with each other, means for raising said hollow cylinder members upwardly about a container, and means for effecting the sealing operation as said sealing heads pass a predetermined point.

13. In a device of the class described, the combination of a plurality of vertically movable cylindrical members adapted to rotate about a common axis, a plurality of sealing heads mounted above said cylindrical members, means for rotating said sealing heads and said cylindrical members in operative relation with each other, means for raising said hollow cylinders upwardly with respect to and about said containers and means for effecting the sealing operation as said sealing heads pass a predetermined point, said last mentioned means operating through the intermediation of a spring to cushion the sealing operation and to minimize breakage of the containers.

14. In a device of the class described, the combination of a sealing head having depending jaws adapted to engage a closure cap, and a hollow member for moving upwardly into engagement with said sealing head to enclose said depending jaws, said hollow member also engaging and closing said jaws.

15. In a device of the class described, the combination of a sealing head, a sealing mechanism in said head comprising an upper die or anvil and a plurality of jaws depending from said head adapted to cooperate with said upper die, and a hollow chamber adapted to fit about the lower end of said sealing head, said hollow member being movable upward to engage and close said depending jaws whereby the seal may be effected by movement of the upper sealing die.

16. In a device of the class described, the combination of a table, a sealing die mounted above said table having depending jaw members adapted to effect a seal on a container, a hollow member nested in said table, a container support within said hollow member and adapted to be moved upwardly to bring the container into engagement with the sealing jaws, means for moving said support upwardly to position the vessel to be sealed, and means for moving said cylinder upwardly about the container to engage said jaws and said sealing head, and to form a vacuum chamber about the lower end of said sealing head.

17. In a sealing machine, the combination of a base, a column mounted upon said base, a table extending about said column adapted to seat containers, said table having a plurality of hollow members adapted to move upwardly with respect to the containers to form chambers about said containers, and a plurality of sealing heads mounted above said hollow members and adapted to be engaged thereby to form chambers thereabout and each of said heads having a member adapted to be moved downwardly to seal caps to the containers.

18. In a sealing machine, the combination of a rotatable table, means for conveying and placing containers on said table, and hollow members adapted to move upwardly through said table to form chambers about the containers, said sealing heads being adapted to cooperate with said hollow members to close the upper ends thereof.

19. In a sealing machine of the class described, the combination of means for conveying and positioning containers, a rotatable table for receiving a positioned container, a sealing head mounted above said container, means adapted to move upwardly and form a chamber about said container and to engage said sealing head, means for exhausting the air from the chamber formed by the hollow member and sealing head, and means for causing the sealing mechanism to seal the container after the air has been exhausted.

20. In a device of the class described, the combination of a rotatable table, a plurality of hollow members on said table normally flush with the upper surface of the table, a plurality of sealing heads positioned above said hollow members adapted to rotate with said table, means for transferring and positioning a container on said table within said hollow members, devices for raising said hollow members upwardly about said containers to engage said sealing heads and to form air tight chambers about the containers, means for exhausting the air from the chambers, and devices for operating said sealing heads.

21. In a device of the class described, the combination of a rotatable table, a plurality of sealing heads mounted above the table and rotatable with the table, means for positioning containers beneath said sealing heads, hollow members extending upwardly through the table for forming chambers about said containers, and the lower ends of said sealing heads, and means for subjecting said chambers to a plurality of suction conduits to form a high vacuum in the chambers prior to the sealing operations.

22. In a device of the class described the combination of a rotatable table, a plurality of sealing heads above the table, rotatable therewith, means for positioning containers under said sealing heads, hollow members extending through said table for forming chambers about said containers and about the lower ends of said sealing heads, a conduit leading from each of said sealing heads, a member having a plurality of ports therein connected to sources of vacuum and adapted to register with the conduits leading to said chambers whereby, when the sealing heads are rotated, the vacuum chambers are subjected consecutively to a plurality of sources of vacuum of different pressure thereby to provide an effective vacuum.

23. In a device of the class described, the combination of a sealing head having a plurality of jaws adapted to close about a closure cap, and a hollow member adapted to form a closed chamber about the lower side of said sealing head, said hollow member being adapted also to engage and close said segmental jaws when in its upper position.

24. In a device of the class described, the combination of a hollow member, supporting means therein, a sealing head mounted above said hollow member having movable members adapted to close about a closure cap, and means for raising said hollow member into engagement with the lower side of said sealing head to form a chamber thereabout, said hollow member being adapted to close said movable members of the sealing head.

25. In a device of the class described, the combination of a table, a plurality of hollow members, container supporting means within said hollow members, sealing heads mounted above said hollow members having segmental jaws, and means for raising said hollow members consecutively into engagement with the lower side of said sealing heads to form chambers thereabout, said hollow members being adapted to operate the segmental jaws of the sealing head.

26. In a device of the class described, the combination of a table, a hollow member normally flush with said table and adapted to move upwardly, a support for a container within said hollow member normally flush with said table, means closing the lower end of said hollow member adapted to engage and raise said support, means for closing the upper end of said hollow member and means for moving said hollow member into engagement with said means for closing the upper end thereof.

27. In a device of the class described, the combination of a plurality of sealing heads having a vertically movable member therein, means comprising hollow members adapted to form a vacuum chamber about each of said sealing heads, means for rotating said sealing heads and said chamber forming means, devices for moving said hollow members upwardly to form chambers about said sealing heads, and a stationary cam operative to move said vertically movable member downwardly to effect the sealing operations as the sealing heads pass a predetermined point.

28. In a device of the class described, the combination of a rotatable table, a plurality of hollow members extending downwardly through said table, a plurality of sealing heads mounted above said hollow members, vessel supports within said hollow members, means for preventing the vessel supports from descending below the level of the table, and means for raising said hollow members consecutively about said vessel supports into engagement with said sealing heads to form vacuum chambers.

29. In a sealing machine, the combination of a rotatable table adapted to seat containers, a plurality of sealing heads, and hollow members mounted adjacent the periphery of said table and adapted to move upwardly through said table and upwardly with respect to said containers to form chambers about said containers, said sealing heads being adapted to co-operate with said hollow members to close the upper ends thereof.

30. In a device of the class described, the combination of a rotatable table, a plurality of cylinders mounted adjacent the periphery of said table and adapted to move upwardly through said table, a plurality of sealing heads mounted above said cylinders and adapted to engage therewith to form vacuum chambers, and means for subjecting said chambers to a plurality of sources of vacuum of substantially different intensities.

31. In a device of the class described, the combination of a rotatable table adapted to seat containers, a plurality of hollow members mounted on said table and adapted to move upwardly through said table and upwardly with respect to the containers, a plurality of sealing heads mounted above said hollow members and adapted to contact therewith when said hollow members are in their upper position to close said hollow members, and means for exhausting the air from said hollow members.

32. In a device of the class described, the combination of a rotatable table, cylindrical members mounted on said table, supporting members for containers within said cylindrical members, said supporting members being adjustable for containers of various heights, and means for moving said cylindrical members upwardly to form chambers on said table about said supporting members.

33. In a device of the class described, the combination of a rotatable table, a series of hollow members mounted adjacent the periphery of said table, said hollow members being adapted to move in a vertical direction, supporting members within said hollow members, said supporting members being adjustable for different heights of containers, and means for moving said hollow members upwardly consecutively as said table revolves.

34. In a device of the class described, the combination of a rotatable table, a plurality of hollow members mounted adjacent the periphery of said table, means for moving said hollow members upwardly from the table to form a series of chambers, and supporting means within said hollow members adapted to move upwardly, said supporting means being adjustable for different heights of containers.

35. In a device of the class described, the combination of a hollow member, a support mounted within said hollow member adapted to receive a container, a sealing head mounted above said support adapted to seal said container, means for moving said hollow member upwardly into engagement with said sealing head, means for raising said support to bring said container into engagement with said sealing head when said hollow member has moved a predetermined distance, and means for varying the relative positions of said sealing head and said support in its upward position to accommodate containers of different heights.

36. In a device of the class described, the combination of a hollow cylinder, a container support mounted within said cylinder, said cylinder being movable in a vertical direction, said cylinder engaging and raising said support when the cylinder has moved a predetermined distance, and means for changing the relative positions of the parts to permit said supporting means to be raised predetermined distances to accommodate containers of various heights.

37. In a device of the class described, the combination of a support, a cylinder extending about said support, means for raising said cylinder, and means adapted to raise said support, said cylinder having a member movable therewith adapted to engage and raise said means, said support and said means being adjustable with respect to each other to permit said table to be raised to different heights for accommodating containers of varying sizes.

ABRAHAM PODEL.